(12) United States Patent
Wall

(10) Patent No.: US 8,371,178 B1
(45) Date of Patent: Feb. 12, 2013

(54) TURBOPUMP WITH ROTOR TORQUE SENSOR

(75) Inventor: Andrew P Wall, Palm Beach Gardens, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 36 days.

(21) Appl. No.: 13/173,380

(22) Filed: Jun. 30, 2011

(51) Int. Cl.
*G01L 25/00* (2006.01)
*G01L 3/02* (2006.01)
*G01M 15/00* (2006.01)

(52) U.S. Cl. ............. 73/862.29; 73/862.191; 73/862.08; 73/1.09; 73/116.03; 73/116.04; 73/116.05

(58) Field of Classification Search ............. 73/862.191, 73/862.193, 862.29, 862.01, 862.08
See application file for complete search history.

(56) References Cited

U.S. PATENT DOCUMENTS

| | | | | |
|---|---|---|---|---|
| 3,138,018 A | * | 6/1964 | Pohl | 73/862.14 |
| 4,955,787 A | * | 9/1990 | Veronesi | 415/118 |
| 7,281,438 B2 | * | 10/2007 | Searle | 73/862.26 |
| 2010/0089136 A1 | * | 4/2010 | Luneburg | 73/112.01 |

OTHER PUBLICATIONS

Hampson et al. "Reusable Rocket Engine Turbopump Condition Monitoring" NASA Technical Report. Jan. 1, 1984, pp. 654-673 <http://ntrs.nasa.gov/archive/nasa/casi.ntrs.nasa.gov/19850018596_1985018596.pdf>.*

* cited by examiner

*Primary Examiner* — Lisa Caputo
*Assistant Examiner* — Jonathan Dunlap
(74) *Attorney, Agent, or Firm* — John Ryznic

(57) ABSTRACT

A turbopump for a rocket engine includes a rotor shaft with a turbine connected to drive the rotor and a centrifugal impeller connected to be driven by the rotor. An electromagnetic powered motor is formed as part of the turbopump and is powered to drive the rotor at a low speed in order to test for an amount of torque required to drive the rotor at the low speed. A load cell is connected to the motor that rotates the rotor shaft. From the use of a load cell the amount of torque required to rotate the rotor can be determined and compared to a known value in order to determine if the turbopump is damaged and requires repairs.

5 Claims, 1 Drawing Sheet

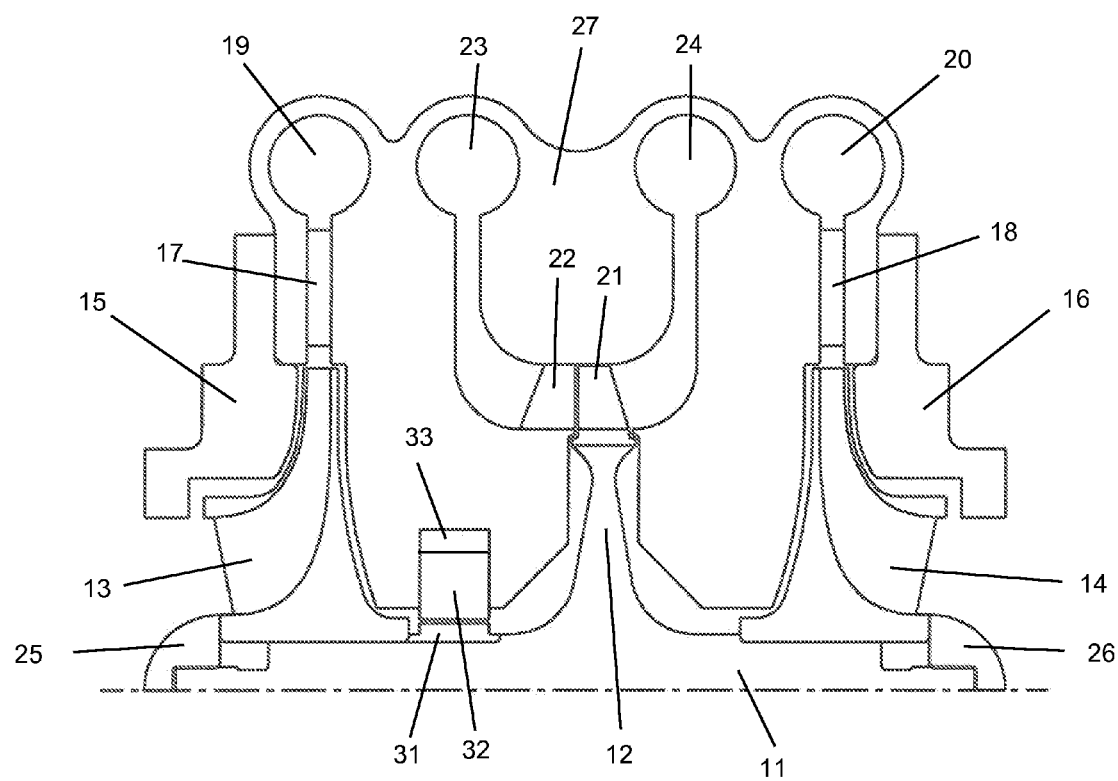

TURBOPUMP WITH ROTOR TORQUE SENSOR

CROSS-REFERENCE TO RELATED APPLICATIONS

This application is related to a non-provisional patent application Ser. No. 12/886,755 filed on Sep. 21, 2010 and entitled TURBOPUMP WITH MAGNETIC ROTOR TORQUE SENSOR.

GOVERNMENT LICENSE RIGHTS

None.

BACKGROUND OF THE INVENTION

1. Field of the Invention

The present invention relates generally to a turbopump for a rocket engine, and more specifically to an apparatus and a process for checking the rotor torque of a turbopump.

2. Description of the Related Art Including Information Disclosed Under 37 CFR 1.97 and 1.98

A rocket engine of the type used to pressurize a fuel or an oxidizer includes a rotor driven by a turbine with one or more impellers connected to the common rotor shaft such that the turbine drives the one or two pumps. A turbopump for a rocket engine requires a relatively high amount of maintenance between uses. In order to achieve a high payoff turbopump with a low investment, a modern turbopump in space propulsion programs is required to have greater service life with lower maintenance costs. In order to achieve lower maintenance costs, the turnaround time between mission cycles must be kept to a minimum. At each cycle, one item on the maintenance checklist to be conducted is a rotor torque check.

In order for a turbopump to be returned to service, among other requirements, it must be clear of all FOD (Foreign Object Damage) as well as free from any damage to the rotor or bearings. One maintenance check that is a valid indicator of FOD or rotor and bearing damage is a rotor torque check. This is when the rotor is turned and the amount of torque resistance is measured. An undamaged rotor will turn with less torque than would a damaged rotor. Failure of a turbopump due to rotor or bearing damage may lead to an event categorized as a Criticality 1 (loss of life or vehicle) failure mode.

In modern turbopumps for a rocket engine, performing a rotor torque check involves timely and costly maintenance procedures. In many cases, inlet piping or structural cases must be removed in order to expose the turbopump rotor. As each piece of hardware is reinstalled, they routinely must undergo lengthy quality checks to ensure proper assembly and function.

BRIEF SUMMARY OF THE INVENTION

A turbopump for a rocket engine includes a rotor with an electromagnet drive device located within the casing and configured to drive the rotor for checking the rotor torque. A load cell is incorporated into the stationary components that make up the electromagnetic motor. From the electrical output of the load cell, the torque required to rotate the rotor is calculated. The calculated torque is then compared to a limit to determine if the turbopump requires further maintenance or can be returned to service.

BRIEF DESCRIPTION OF THE SEVERAL VIEWS OF THE DRAWINGS

FIG. 1 shows a cross section view of a rocket engine turbopump with an electromagnet motor of the present invention.

DETAILED DESCRIPTION OF THE INVENTION

The turbopump for a rocket engine is shown in FIG. 1 and includes a single rotor shaft driven by a turbine to drive two centrifugal impellers with a first impeller for an oxidizer and a second impeller for a fuel. However, the features and advantages of the present invention is not limited to two impellers on a single rotor shaft, but could be used for any type of turbomachine in which rotor torque measurement is required.

FIG. 1 shows the turbopump with a rotor 11 having a turbine rotor disk 12 formed between a first centrifugal impeller 13 and a second centrifugal impeller 14. A first shroud 15 covers the first impeller 13 and a second shroud 16 covers the second impeller 14. The first impeller 13 discharges the fluid through a first diffuser 17 and into a first pump volute 19. The second impeller 14 discharges a second fluid through a second diffuser 18 and into a second pump volute 20. The two volutes 19 and 20 channel the fluids into a combustion chamber of the rocket engine.

The turbine that drives the rotor 11 includes a turbine inlet volute 23, a guide vane 22, a turbine blade 21 and a turbine outlet volute 24. In an expander cycle rocket engine, portions of the fuel and the oxidizer are burned to produce a hot gas stream that is used to pass through the turbine and drive the rotor with the turbine exhaust then discharged into the inlet of one of the centrifugal impellers depending upon which is the dominant fluid within the turbine exhaust.

To measure rotor torque, an electromagnetic motor is secured to the turbopump assembly that is used to rotate the rotor for inspection. The electromagnetic motor includes a rotating permanent magnet assembly 31 secured onto the rotor 11, and an electromagnetic assembly 32 secured to the casing 27 that does not rotate. A series of electromagnets will be packaged into the assembly 32 that will be installed into a turbopump. A load cell 33 will be packaged into the assembly 32 that will be installed into a turbopump. The rotor of the turbopump will be made such that permanent magnets can be installed onto it. Once assembled, the permanent magnets will be in close proximity to the electromagnetic assembly so that once powered; the electromagnetic assembly 32 will interact with the permanent magnets 31 and cause the rotor 11 to rotate.

To check the rotor of the turbopump for damage after a mission cycle, an electric current is delivered to the electromagnets in the electromagnetic assembly 32 to create a magnetic field that will react with the permanent magnets 31 attached to the rotor 11. This will cause the rotor to rotate at a certain speed depending upon any resistance due to damage. With the rotor rotating under the influence of the electromagnets, the torque required to rotate the shaft is measured by the load cell 33. The calculated torque can be compared to a limiting value in order to determine if the turbopump requires further maintenance or can be returned to service. An undamaged rotor will rotate at a certain speed with less torque than would a damaged rotor because of the increased resistance due to the damage.

Because the electromagnet assembly 32 used to rotate the rotor 11 is built into the turbopump assembly, no disassembly of the turbopump is required in order to perform a rotor torque check, as is performed in the prior art turbopump rotor torque checking devices. What would normally take two days to check for a damaged rotor through the rotor torque check would take a few minutes using the rotor torque check apparatus and process of the present invention. Much shorter turn-around times can thus be performed on the rocket engine.

In a prior invention by this applicant, a speed sensor was attached to the turbopump so that the rotor speed can be measured when the electromagnet assembly is rotating the rotor 11. The speed sensor can be part of the rotor torque check assembly formed within the turbopump or can be a rotation sensor attached to the turbopump rotor only for use during the rotor torque check process. With the rotor rotating under the influence of the electromagnets, the input power delivered to the electromagnets is measured, and the shaft speed is measured. With the input power and the rotor shaft speed known, the torque required to rotate the rotor can be calculated. In this prior invention, both the rotor speed and the input power to drive the electromagnet assembly to rotate the rotor shaft are required in order to determine the torque on the rotor shaft. Thus, two measurements supplied by two sensors are required. In the present invention, these two sensors that require two measurements are replaced with one sensor (the load cell) that requires only one measurement to determine the torque on the rotor shaft.

I claim the following:

1. A turbopump for a rocket engine comprising:
   a rotor of the turbopump of the rocket engine;
   a turbine of the turbopump of the rocket engine rotatably secured to the rotor in order to drive the rotor;
   a centrifugal impeller of the turbopump of the rocket engine rotatably secured to the rotor in order to be driven by the rotor;
   a motor secured to the turbopump to rotate the rotor at a low speed to check for a rotor torque; and,
   a load cell connected to the motor to measure a torque input of the motor when driving the rotor at the low speed in order to determine if the turbopump is damaged.

2. The turbopump of claim 1, and further comprising:
   the motor secured to the turbopump includes an electromagnet and a permanent magnet.

3. The turbopump of claim 2, and further comprising:
   the permanent magnet is secured to the rotor; and,
   the electromagnet and the load cell is secured to the turbopump casing.

4. A process for detecting a damaged rotor in a turbopump for a rocket engine, the turbopump including a turbine to drive the rotor and a centrifugal impeller to be driven by the rotor, the process comprising the steps of:
   locating a motor to drive the rotor at a low speed within the turbopump so that the turbopump does not need to be disassembled in order to check for torque necessary to drive the rotor at the low speed;
   measuring an amount of torque generated by the motor that rotates the rotor at the low speed; and,
   determining if the turbopump is damaged by comparing the amount of torque required to rotate the rotor at the low speed with a known value of torque required to rotate the rotor for an undamaged turbopump.

5. The process for detecting a damaged rotor in a turbopump of claim 4, and further comprising the step of:
   if the torque required to rotate the rotor at the low speed is below a certain value, then returning the turbopump to service without disassembling the turbopump.

\* \* \* \* \*